A. HAMLIN.
Churn.
No. 53,141. Patented March 13, 1866.
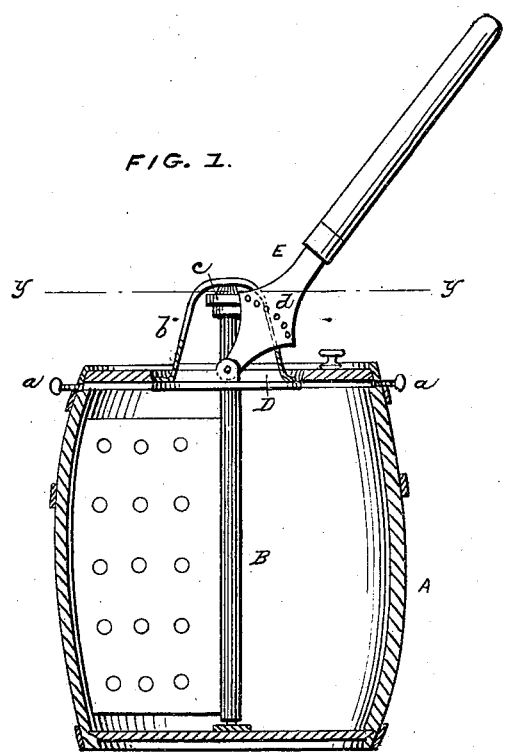
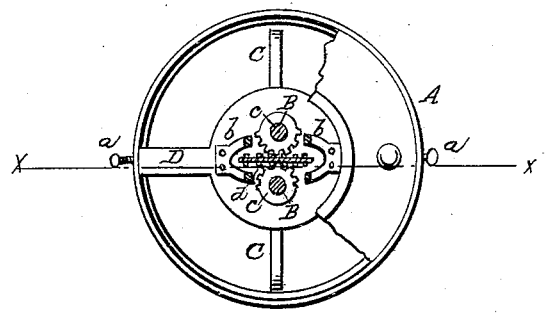
WITNESSES:
INVENTOR.

UNITED STATES PATENT OFFICE.

AMOS HAMLIN, OF SCHOHARIE, NEW YORK.

IMPROVEMENT IN CHURNS.

Specification forming part of Letters Patent No. 53,141, dated March 13, 1866.

*To all whom it may concern:*

Be it known that I, AMOS HAMLIN, of Schoharie, in the county of Schoharie and State of New York, have invented a new and Improved Churn; and I do hereby declare that the following is a full, clear, and exact description thereof, which will enable those skilled in the art to make and use the same, reference being had to the accompanying drawings, forming part of this specification, in which—

Figure 1 represents a vertical central section of this invention, the line $x$ $x$, Fig. 2, indicating the plane of section. Fig. 2 is a horizontal section of the same, taken in the plane indicated by the line $y$ $y$, Fig. 1.

Similar letters of reference indicate like parts.

This invention relates to a churn with two dashers, which are secured to independent upright shafts, to each of which an oscillating motion is imparted in a direction opposite to that of the other in such a manner that the milk is literally squeezed between the two dashers as the same sweep through the tub in opposite directions, and the largest possible percentage of butter contained in the milk is obtained in a comparatively short time. The shafts receive their motion from an oscillating handle which is hinged to a lug or bracket rising from a bridge-tree which forms the bearings for said shafts, and which, together with the shafts and dashers can be readily removed for the purpose of cleaning the tub. Said handle is provided with two rows of teeth, which gear in pinions mounted on the upper ends of the shafts.

A represents the tub of my churn, which is formed, in any desirable manner, of wood or any suitable material. Its bottom is provided with two sockets to receive the lower ends of the upright shafts B, to which the dashers C are secured. Said shafts pass up through a bridge, D, which is secured in the upper part of the tub by thumb-screws, $a$, or any other suitable means, so that it can be readily removed, together with the shafts and dashers, for the purpose of cleaning the tub.

The upper ends of the shafts B have their bearings in a yoke, $b$, which rises from the bridge D, and each shaft bears a pinion, $c$, the cogs of which gear in teeth $d$ projecting from the opposite surfaces of the handle E. This handle is hinged to ears $e$, rising from the bridge D between the two shafts, and it oscillates back and forth in a slot in the yoke $b$, as shown in the drawings. The ends of said slot limit the motion of the handle and allow the same to move just far enough to bring the dashers close together without touching.

By imparting to the handle an oscillating motion the dashers are caused to sweep through the milk in the tub in opposite directions, and the milk is literally squeezed between them and forced to pass through the holes in the dasher with great rapidity and divided in a number of small currents or jets. By this operation the largest possible percentage of the butter contained in the milk is obtained and the operation of churning is rendered simple and easy.

The whole churn is so constructed that it can easily be cleaned, and all its parts are so arranged that the same are not liable to get out of order.

If desired, the dashers, instead of being made of perforated pieces of wood, can be made of slats, or in any other suitable manner capable of producing the desired effect.

What I claim as my invention, and desire to secure by Letters Patent, is—

1. The combination of the handle E with a double set of cogs, $d$ $d$, and the two reciprocating shafts B B with segment-pinions C C, all constructed and arranged to operate as and for the purpose specified.

2. The movable bridge D, in combination with the shafts B, dashers C, handle E, and tub A, constructed and operating substantially as and for the purpose described.

AMOS HAMLIN.

Witnesses:
J. W. SMITH,
J. B. GRANT.